CHARLES BARRETT.
Improvement in Dumping Car.
No. 123,762. Patented Feb. 20, 1872.
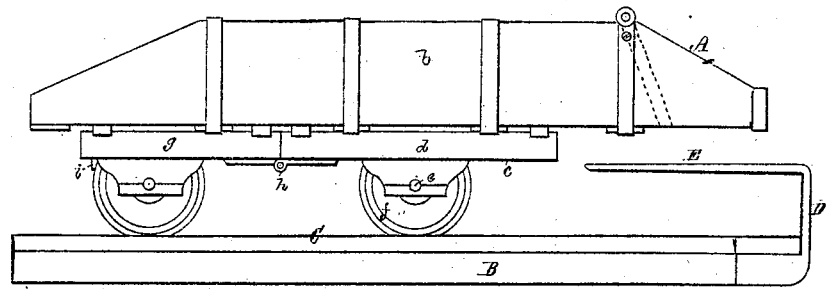
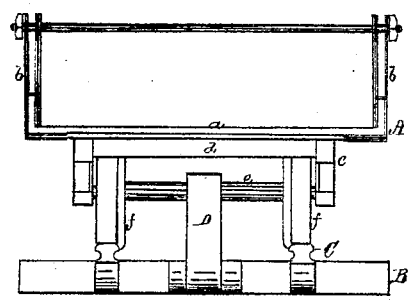 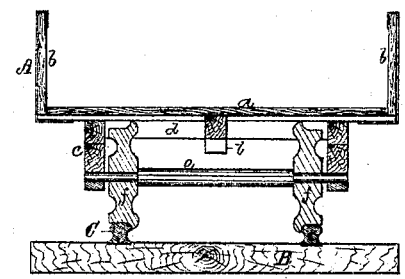
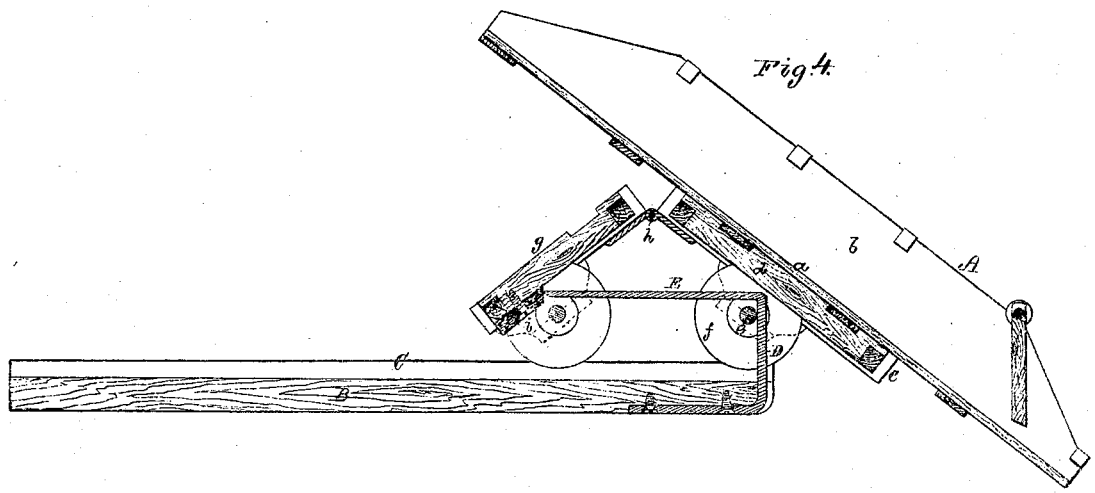
Witnesses.
W. E. Boardman
James W. Searing
Charles Barrett.
by his attorney
Frederick Curtis

UNITED STATES PATENT OFFICE.

CHARLES BARRETT, OF BOSTON, MASSACHUSETTS.

IMPROVEMENT IN DUMPING-CARS.

Specification forming part of Letters Patent No. 123,762, dated February 20, 1872.

*To all to whom these presents shall come:*

Be it known that I, CHARLES BARRETT, of Boston, in the county of Suffolk and Commonwealth of Massachusetts, have made an invention of certain Improvements in Dumping-Cars for railway uses; and do hereby declare the following to be a full, clear, and exact description thereof, due reference being had to the accompanying drawing making part of this specification, and in which—

Figure 1 is a side elevation; Fig. 2, a front-end elevation; and Fig. 3, a transverse section of my invention, the latter figure being taken through the pivot or axle of the forward portion of the truck. Fig. 4 is a vertical section of the car in a tilted position.

The car herein described is designed for loading the tenders of locomotive-engines with coal, the purpose of the invention being twofold—that is, of reducing the height of a dumping-car as much as is practicable and of effecting with very little labor the discharge of its contents.

In principle, this invention consists, first, in dividing the truck of a car at about its center, or in adopting two short trucks and hinging or pivoting these two objects together, the forward half being affixed rigidly to the platform or bottom of the car or box, and the rearmost half being independent thereof, in order that the said box or body of the car may be tilted into an inclined position, with the forward axle as a turning-point, the axle of the forward truck being so disposed with respect to the center of gravity of the box as to nearly balance the same, in order that its contents may be discharged with very little exertion. Incidentally, this invention will be found to consist in the employment of a post or abutment and a horizontal bar, or their equivalents, so arranged upon the platform or staging which supports the car as to intercept the truck and effect a positive stop of the forward truck, and consequently of the car, while the rearmost truck is permitted to advance and double up-on its fellow to such an extent as to effect a tilting or inclination of the car sufficient to dump its contents into the tender below.

The drawing accompanying this specification represents at A a trough or endless dumping-box, whereof the platform is shown at $a$ and the two sides at $b\ b$. The forward truck or semi-truck is shown at $c$ as composed of a rectangular frame, $d$, an axle, $e$, and two wheels, $f\ f$, and is affixed rigidly to the bottom of the platform $a$, the said axle being disposed at about the center of the box A, or slightly in rear thereof, while the rear truck, which is formed similar to the first, is shown at $g$, and is hinged to it, as shown at $h$ in the drawing. The dumping-box A is provided at one or both ends with a leaf or gate, which is pivoted to it in a suitable manner, and which serves, to some extent, to confine the coal within the box, the tilting of the box having the effect of separating its bottom from the gate, and allowing the coal to pass between the two. B represents the floor of the stage, upon which is laid the elevated track C, below which the tender is situated when receiving a supply of coal. D represents a post affixed to the front end of this floor, and E a horizontal bar projecting horizontally rearward from such post a short distance, the height of the post and bar being such as to permit the axles of the two trucks to pass immediately below it. The dumping box or car, having received its load of coal, is propelled along the track C until the forward axle abuts against the post D and its further advance stopped. The forward end of the box A is now lowered and such box tilted into an inclined position, turning upon its forward axle $e$ as a pivot, while, at the same time, the rearmost truck advances and the two double or close toward one another, as shown in Fig. 4 of the drawing, by this act discharging the contents of the box into the tender below. The advance of the rear truck, and consequently the angle or pitch of the box A, is determined by a projection or stop, $i$, affixed to the center of the truck, as represented, which brings up against the end of the bar E, and this stop may be adjustable, in order that, by varying its position, the slope of the two trucks and of the car may be regulated as desired; or the same result may be obtained by increasing or curtailing the length of the bar E with respect to the post D; and in either case the shaft of the rear truck may aid in the estoppel of the said truck, and will, in any event, prevent such truck from leaving the track.

By applying the trucks directly to the platform or bottom of the dumping-box, which my construction permits me to do, I am enabled to considerably reduce the present height of a dumping-car, while, by my system of hinged trucks, I am enabled to reduce to the minimum point the labor required to dump the contents of the box. I am also enabled to furnish a dumping-car for the purpose specified at very small cost.

*Claims.*

I claim—

1. A dumping-car composed of a suitable box or body mounted upon two trucks or semi-trucks pivoted together, one of which is fixed rigidly to the said box and the other independent thereof, and the whole operating as stated.

2. I claim, in combination with a dumping-car constituted as last stated, the post D and bar E, or their equivalents, for arresting, at the proper time, the advance of the two trucks, for purposes stated.

CHARLES BARRETT.

Witnesses:
   FRED. CURTIS,
   W. E. BOARDMAN.